United States Patent
Qin et al.

(10) Patent No.: US 10,705,368 B2
(45) Date of Patent: Jul. 7, 2020

(54) DISPLAY PANEL AND MANUFACTURING METHOD THEREOF

(71) Applicants: BOE TECHNOLOGY GROUP CO., LTD., Beijing (CN); KENT STATE UNIVERSITY, Kent, OH (US)

(72) Inventors: Guangkui Qin, Beijing (CN); Dengke Yang, Beijing (CN); Xiaochen Zhou, Beijing (CN)

(73) Assignees: BOE TECHNOLOGY GROUP CO., LTD., Beijing (CN); KENT STATE UNIVERSITY, Kent, OH (US)

( * ) Notice: Subject to any disclaimer, the term of this patent is extended or adjusted under 35 U.S.C. 154(b) by 429 days.

(21) Appl. No.: 15/503,639

(22) PCT Filed: Jun. 28, 2016

(86) PCT No.: PCT/CN2016/087455
§ 371 (c)(1),
(2) Date: Feb. 13, 2017

(87) PCT Pub. No.: WO2017/063379
PCT Pub. Date: Apr. 20, 2017

(65) Prior Publication Data
US 2017/0269401 A1    Sep. 21, 2017

(30) Foreign Application Priority Data

Oct. 13, 2015  (CN) .......................... 2015 1 0671657

(51) Int. Cl.
*G02F 1/1334*   (2006.01)
*G02F 1/1335*   (2006.01)
(Continued)

(52) U.S. Cl.
CPC ........ *G02F 1/1334* (2013.01); *G02F 1/13363* (2013.01); *G02F 1/13439* (2013.01);
(Continued)

(58) Field of Classification Search
CPC ................. G02F 1/1333; G02F 1/1334; G02F 1/133553; G02F 1/133555;
(Continued)

(56) References Cited

U.S. PATENT DOCUMENTS

| 7,414,685 B2 | 8/2008 | Yang |
| 2005/0128389 A1* | 6/2005 | Yang ................. G02F 1/133555 349/114 |

(Continued)

FOREIGN PATENT DOCUMENTS

| CN | 1851547 A | 10/2006 |
| CN | 1928647 A | 3/2007 |

(Continued)

OTHER PUBLICATIONS

Zhibing GE, et al; "Single cell gap and wide-view transflective liquid crystal display using fringe field switching and embedded wire grid polarizer", Applied Physics Letters 92, 4 pages, published online Feb. 6, 2008.

(Continued)

*Primary Examiner* — Eli D. Strah

(57) ABSTRACT

A display panel and a manufacturing method thereof are provided. Each pixel of the display panel includes a transmission region and a reflection region, and the display panel includes a first polarizer, a first base substrate, a first alignment layer, a liquid crystal layer, a second alignment layer, a second base substrate, and a second polarizer. A reflection layer is provided between the second alignment layer and the second polarizer in the reflection region. The liquid crystal layer in the reflection region includes nematic liquid crystal and a polymer network. The liquid crystal layer in the transmission region includes a liquid crystal mixture including the nematic liquid crystal and polymerizable monomers. The polymer network in reflection region (Continued)

is formed by polymerizing the polymerizable monomers in the liquid crystal mixture.

19 Claims, 5 Drawing Sheets

(51) Int. Cl.

| | | |
|---|---|---|
| *G02F 1/13363* | (2006.01) | |
| *G02F 1/1337* | (2006.01) | |
| *G02F 1/1343* | (2006.01) | |
| G02B 5/30 | (2006.01) | |
| C09K 19/02 | (2006.01) | |
| C09K 19/54 | (2006.01) | |

(52) U.S. Cl.
CPC .. *G02F 1/133528* (2013.01); *G02F 1/133555* (2013.01); *G02F 1/133711* (2013.01); *G02F 1/133788* (2013.01); *G02F 1/134309* (2013.01); *B32B 2457/202* (2013.01); *C09K 19/0208* (2013.01); *C09K 2019/546* (2013.01); *C09K 2019/548* (2013.01); *G02B 5/30* (2013.01); *G02B 5/3025* (2013.01); *G02F 2001/13345* (2013.01); *G02F 2001/133538* (2013.01); *G02F 2001/133638* (2013.01); *G02F 2201/121* (2013.01); *G02F 2201/123* (2013.01); *G02F 2203/01* (2013.01); *G02F 2203/02* (2013.01); *G02F 2203/09* (2013.01); *G02F 2413/02* (2013.01); *G02F 2413/05* (2013.01); *G02F 2413/08* (2013.01); *Y10T 428/1005* (2015.01)

(58) Field of Classification Search
CPC ........... G02F 1/133528; G02F 1/13363; G02F 1/133711; G02F 1/133788; G02F 1/134309; G02F 1/13439; G02F 2413/08; G02F 2413/02; G02F 2413/05; G02F 2203/09; G02F 2203/01; G02F 2203/02; G02F 2001/13345; G02F 2001/133638; G02F 2001/133538; G02F 2201/121; G02F 2201/123; C09K 2019/548; C09K 2019/546; C09K 19/0208; G02B 5/3025; G02B 5/30; Y10T 428/1005; B32B 2457/202

See application file for complete search history.

(56) References Cited

U.S. PATENT DOCUMENTS

| | | |
|---|---|---|
| 2005/0128390 A1 | 6/2005 | Yang |
| 2005/0264730 A1 | 12/2005 | Kataoka et al. |
| 2006/0023146 A1* | 2/2006 | Yang ............... G02F 1/133555 349/114 |
| 2006/0240587 A1 | 10/2006 | Yang |
| 2006/0256264 A1 | 11/2006 | Yang et al. |
| 2008/0074585 A1* | 3/2008 | Yoshimi ............ G02F 1/133528 349/96 |
| 2011/0051049 A1* | 3/2011 | Goetz .................... C09K 19/32 349/86 |
| 2012/0075554 A1* | 3/2012 | Uehara ............. G02F 1/133634 349/62 |
| 2013/0114028 A1 | 5/2013 | Xu et al. |
| 2015/0177565 A1 | 6/2015 | Wang et al. |
| 2015/0212369 A1 | 7/2015 | Zhao |
| 2016/0054621 A1 | 2/2016 | Xie |

FOREIGN PATENT DOCUMENTS

| | | |
|---|---|---|
| CN | 102629034 A | 8/2012 |
| CN | 102944958 A | 2/2013 |
| CN | 103176307 A | 6/2013 |
| CN | 103207474 A | 7/2013 |
| CN | 103293759 A | 9/2013 |
| CN | 105223725 A | 1/2016 |
| TW | I333091 B | 11/2010 |

OTHER PUBLICATIONS

Jung Hwa Her, et al; "P-139: Transflective Fringe-Field Switching Liquid Crystal Display without Any Retarder", SID, vol. 41, Issue 1; May 2010; pp. 1783-1786.

Hyang Yul Kim, et al; "Wide-view transflective liquid crystal display for mobile applications", Applied Physics Letters 91; 3 pages, published online Dec. 5, 2007.

International Search Report and Written Opinion dated Aug. 26, 2016; PCT/CN2016/087455.

The First Chinese Office Action dated Nov. 4, 2016, Appln. No, 201510671657.5.

The Second Chinese Office Action dated Mar. 13, 2017; Appln. No. 201510671657.5.

* cited by examiner

DISPLAY PANEL AND MANUFACTURING METHOD THEREOF

CROSS-REFERENCE TO RELATED APPLICATIONS

The present application claims the priority of China Patent application No. 201510671657.5 filed in China on Oct. 13, 2015, which is incorporated herein by reference in its entirety.

FIELD OF THE DISCLOSURE

The present disclosure relates to the field of transflecting liquid crystal display technology, in particular to a display panel and a manufacturing method thereof.

BACKGROUND

Liquid crystal display devices are mainly classified into transmission type and reflection type. The former displays with light from a backlight, and therefore its light source is stable but the consumption of energy is large; the latter displays with ambient light, and therefore its consumption of energy is low, but the display effect relies on external environment. In order to combine advantages of both display modes, a transflecting liquid crystal display device has been proposed, that is, each pixel includes both a transmission region and a reflection region.

For a transflecting liquid crystal display device, it is obvious that light in the transmission region can pass the liquid crystal layer once only, while light in the reflection region passes the liquid crystal layer twice, in which case a special solution is necessary to achieve the same display effect in both regions. The existing solutions are mainly classified into two types: dual-cell-thickness and single-cell-thickness. Dual-cell-thickness means different thicknesses of liquid crystal layer are provided in the two regions, which facilitates achieving the same display effect, but suffers from problems such as liquid crystal disorder in the transition location between two regions and difficult control over the cell gaps.

Therefore, a single-cell-thickness liquid crystal display device in which liquid crystal layer thickness is the same in both the transmission and reflection regions has a more promising development. In order to achieve the same display effect in case of single-cell-thickness, it is necessary to adjust the structure of the reflection region. For example, it is possible to have the initial alignment direction of nematic liquid crystal in reflection regions to form an angle of about 10 degree with the electrodes in a partial IPS mode (In Plane Switching) and ADS switch mode (Advanced Super Dimension Switch) liquid crystal display device. However, this would cause dark state light leakage, reduced contrast and blur boundary between two regions. In order to address the above problem, it is also possible to add an additional ¼ wave plate (in-cell retarder) in the reflection region. However, this will result in a complex manufacturing process.

SUMMARY in view of the problems with current transflecting liquid crystal display devices such as dark state leakage and complex manufacturing process, the present disclosure provides a display panel with reduced dark state leakage and simple manufacturing process, and a manufacturing method thereof.

In order to achieve the above-mentioned object, an embodiment of the present disclosure provides a display panel comprising a plurality of pixels, each of which includes a transmission region and a reflection region, and comprising a first polarizer, a first base substrate, a first alignment layer, a liquid crystal layer, a second alignment layer, a second base substrate, and a second polarizer that are disposed in turn. A reflection layer is provided between the second alignment layer and the second polarizer in the reflection region. The liquid crystal layer in the reflection region includes nematic liquid crystal and a polymer network. The liquid crystal layer in the transmission region includes a liquid crystal mixture including the nematic liquid crystal and polymerizable monomers. The polymer network in the reflection region is formed by polymerizing the polymerizable monomers in the liquid crystal mixture. In case of no electric field, an alignment direction of the nematic liquid crystal in the reflection region is different from that of the first alignment layer, and an alignment direction of the nematic liquid crystal in the transmission region is same as that of the first alignment layer.

In one example, the polymerizable monomers in the liquid crystal mixture in the transmission region may also be polymerized into the polymer network.

That is, in the display panel according to an embodiment of the present disclosure, the liquid crystal layer contains a liquid crystal mixture containing the nematic liquid crystal and polymerizable monomers. In the liquid crystal layer corresponding to the reflection region, polymerizable monomers in the liquid crystal mixture are polymerized into the polymer network. Therefore, the nematic liquid crystal in the reflection region achieves an orientation different from that of the nematic liquid crystal in the transmission region by the assistant alignment effect of the polymer network. In addition, in the liquid crystal layer corresponding to the transmission region, polymerizable monomers in the liquid crystal mixture may exist in monomer form or be polymerized into the polymer network.

In one example, polarization transmission directions of the first polarizer and the second polarizer are perpendicular to each other. Orientations of the first alignment layer and the second alignment layer are parallel or anti-parallel to each other. The orientation of the first alignment layer is perpendicular to the polarization transmission direction of the first polarizer.

In one example, in case of no electric field, the liquid crystal layer in the reflection region is capable of deflecting, by 90 degrees, a polarization direction of linearly polarized light incident in a direction from the first base substrate and reflected by the reflection layer.

In one example, a thickness d of the liquid crystal layer satisfies a formula: $2nd=\lambda(2k+3/2)$, where n is a specific birefringence of the nematic liquid crystal, k is an integer greater than or equal to 0, and $\lambda$ is a wavelength of visible light.

In one example, k is 0; and d is from 1 μm to 10 μm.

In one example, in case of no electric field, an equivalent optical axis of the liquid crystal layer in the reflection region forms a 45 degree angle with the polarization transmission direction of the first polarizer.

In one example, the display panel further includes: a first half-wave plate disposed between the first alignment layer and the first polarizer, wherein an optical axis of the first half-wave plate is parallel to an equivalent optical axis of the liquid crystal layer in the reflection region in case of no electric field; and a second half-wave plate disposed between the second alignment layer and the second polarizer, wherein the second half-wave plate is farther from the liquid crystal layer than the reflection layer and the second half-wave plate has an optical axis perpendicular to that of the first half-wave plate.

In one example, the display panel further includes a first electrode and a second electrode disposed on one of the base substrates, wherein one of the first electrode and the second electrode is a pixel electrode, and the other is a common electrode.

In one example, the first electrode is a plate electrode, the second electrode comprises a plurality of strip electrodes, an insulating layer is disposed between the first electrode and the second electrode, and the first electrode is farther away from the liquid crystal layer than the second electrode. The strip electrode has a width from for example 1 µm to 10 µm. A distance between two adjacent ones of the plurality of strip electrodes is from 1 µm to 10 µm.

In another example, the first electrode and the second electrode comprise a plurality of strip electrodes arranged alternatively. Each of the strip electrodes has a width from 1 µm to 10 µm. A distance between two adjacent ones of the plurality of strip electrodes is from 1 µm to 10 µm.

In one example, the polymerizable monomers each have a linear aliphatic chain having ester end group at its molecule end. Alternatively, the polymerizable monomers each have a phenylene or a biphenylene and at least one methylene in the middle of its molecule, wherein the phenylene or the biphenylene may be replaced by one or more of alkyl or halogen groups. Alternatively, the polymerizable monomer includes at least one phenylene or biphenylene and a (methyl) acrylate end group connected with it by a bivalent alkylidene group, wherein the phenylene or biphenylene may be replaced by one or more alkyls or halogens.

In one example, the polymerizable monomers have a degree of functionality greater than 1.

In one example, a weight percentage of the polymerizable monomers in the liquid crystal mixture is from 0.01 wt % to 15 wt %.

In one example, the polymerizable monomers are photo polymerizable monomers, and the polymer network is formed by light polymerization of the polymerizable monomers in the liquid crystal mixture.

Furthermore, the liquid crystal mixture further contains photoinitiator with a weight percentage from 0.001 wt % to 2 wt % in the liquid crystal mixture.

Another embodiment of the present embodiment provides a manufacturing method of the above-mentioned display panel, including: providing a liquid crystal mixture between a first alignment layer and a second alignment layer and applying an electric field to the liquid crystal mixture, and then allowing only polymerizable monomers in the liquid crystal mixture in the reflection region to be polymerized into a polymer network.

In one example, the electric field has a strength from 0.5 V/µm to 5 V/µm.

In one example, the manufacturing method further includes: in case of no electric field, allowing only the polymerizable monomers in the liquid crystal mixture in the transmission region to be polymerized into the polymer network.

In one example, for the above-mentioned display panel using photo polymerizable monomers, allowing only polymerizable monomers in the liquid crystal mixture in the reflection region to be polymerized into the polymer network includes: disposing a mask on one side of the display panel to mask transmission regions, and illuminating the display panel with light from a side of the mask, which side is away from the display panel, to allow polymerizable monomers in the liquid crystal mixture in reflection regions to be polymerized into the polymer network.

The technical proposal of the present disclosure has the following beneficial technical effects. For the display panel according to an embodiment of the present disclosure, the nematic liquid crystal in the reflection region achieves an alignment direction different from that of the nematic liquid crystal in the transmission region by means of the assisting directing effect of the polymer network, thereby ensuring a good dark state display effect for both regions without adding any in-cell retarder, increasing the contrast and simplifying the manufacturing method. And the transmission region and the reflection region have sharp boundary therebetween without any transition regions. At the same time, both the transmission region and the reflection region have wide viewing angles and the TV curve (the display curve of the transmission region) and the RV curve (the display curve of the transmission region) match each other.

Figure 1:
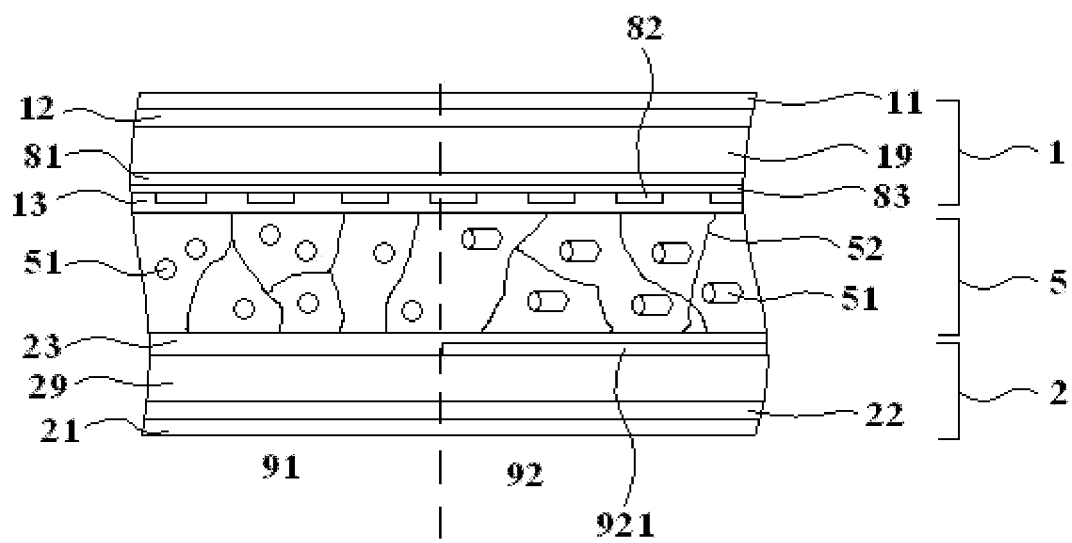
FIG. 1 is a schematic diagram showing a part cross section structure of a display panel according to an embodiment of the present disclosure.

REFERENCE NUMERALS 1, first substrate; 11, first polarizer; 12, first half-wave plate; 13, first alignment layer; 19, first base substrate; 2, second substrate; 21, second polarizer; 22, second half-wave plate; 23, second alignment layer; 29, second base substrate; 5, liquid crystal layer; 51, nematic liquid crystal; 52, polymer network; 521, polymerizable monomers; 81, first electrode; 82, second electrode; 83, insulating layer; 91, transmission region; 92, reflection region; 921, reflection layer.

DETAILED DESCRIPTION OF EMBODIMENTS

In order for those skilled in the art to better understand the technical proposal of the present disclosure, the present disclosure will be further described in detail below with reference to accompanying drawings and specific implementations.

According to one embodiment of the present disclosure, there is provided a display panel including a plurality of pixels, and each pixel includes a transmission region and a reflection region, and the display panel includes a first polarizer, a first base substrate, a first alignment layer, a liquid crystal layer, a second alignment layer, a second base substrate, and a second polarizer that are disposed in turn.

A reflection layer is provided between the second alignment layer and the second polarizer in the reflection regions.

The liquid crystal layer in the reflection region includes nematic liquid crystal and a polymer network; and the liquid crystal layer in the transmission region includes a liquid crystal mixture, and the liquid crystal mixture includes nematic liquid crystal and polymerizable monomers.

The polymer network in the reflection region is formed by polymerizing the polymerizable monomers in a liquid crystal mixture.

In case of no electric field being applied, the alignment direction of nematic liquid crystal in the reflection region is different from the alignment direction of the first alignment layer, and the alignment direction of nematic liquid crystal in the transmission region is the same as the alignment direction of the first alignment layer.

According to another embodiment of the present disclosure, there is provided a manufacturing method of the above-mentioned display panel, the method including the following operations:

providing a liquid crystal mixture between the first alignment layer and the second alignment layer and applying an electric field to the liquid crystal mixture, and then allowing only the polymerizable monomers in the liquid crystal mixture in the reflection region to be polymerized into a polymer network.

For the display panel according to an embodiment of the present disclosure, the nematic liquid crystal in a reflection region achieves an alignment direction different from that of the nematic liquid crystal in a transmission region by means of the assisting directing effect of the polymer network, thereby ensuring a good dark state display effect for the both regions without adding any in-cell retarder, increasing the contrast and simplifying the manufacturing method. The transmission region and the reflection region have sharp boundary therebetween without any transition region. Also, both the transmission region and the reflection region have wide viewing angles and the TV curve (the display curve of the transmission region) matches the RV curve (the display curve of the transmission region).

Embodiment I

The present embodiment provides a display panel (liquid crystal display panel). The display panel of the present embodiment will be described in detail with reference to FIGS. 1 to 6. The display panel of the present embodiment includes a plurality of pixels. As illustrated in FIG. 1, each pixel includes a transmission region 91 and a reflection region 92, and the display panel includes a first polarizer 11, a first base substrate 19, a first alignment layer 13, a liquid crystal layer 5, a second alignment layer 23, a second base substrate 29, and a second polarizer 21 that are disposed in turn (from top to bottom as illustrated in FIG. 1).

A reflection layer 921 is provided between the second alignment layer 23 and the second polarizer 21 in the reflection region 92. In the present embodiment, the reflection layer 921 is disposed between the second base substrate 29 and the second alignment layer 23, to which the embodiment is not limited however.

Figure 9:
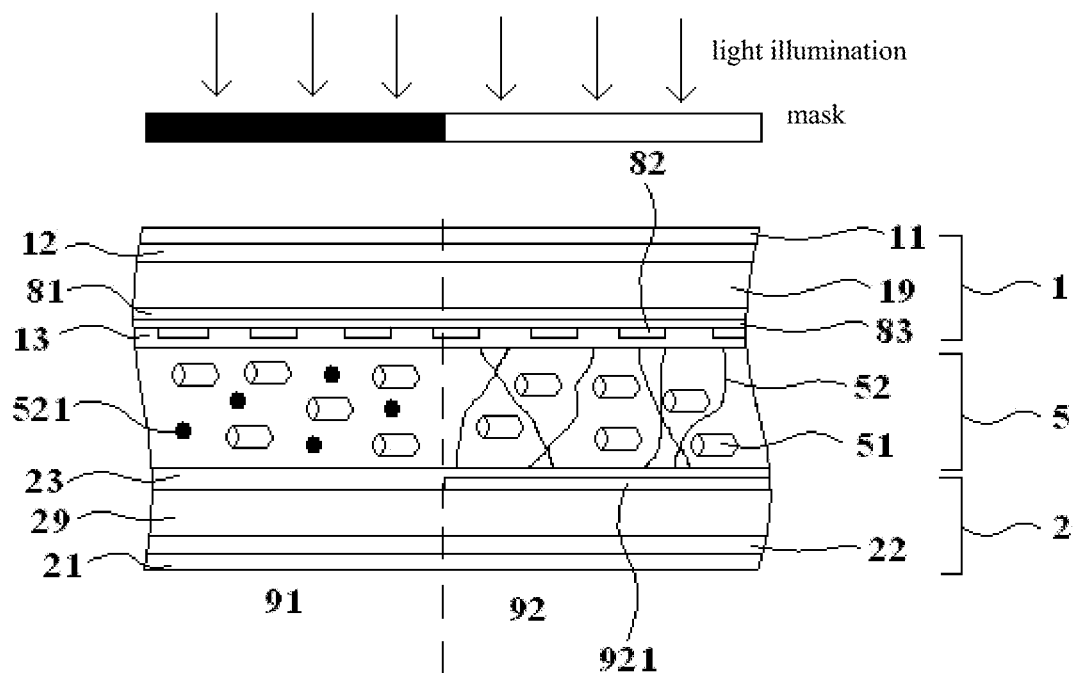
FIG. 9 is a schematic diagram showing a part cross section structure in a manufacturing method of a display panel upon the first irradiation according to another embodiment of the present disclosure.

The liquid crystal layer 5 in the reflection region 92 includes nematic liquid crystal 51 and a polymer network 52. The liquid crystal layer 5 in the transmission region 91 includes a liquid crystal mixture that includes nematic liquid crystal 51 and polymerizable monomers 521 (as illustrated in FIG. 9).

In case of no electric field being applied, the alignment direction of nematic liquid crystal 51 in the reflection region 92 is different from the alignment direction of the first alignment layer 13, and the alignment direction of nematic liquid crystal 51 in the transmission region 91 is the same as the alignment direction of the first alignment layer 13.

That is, the display panel of the present embodiment includes a first substrate 1, a second substrate 2 and a liquid crystal layer 5 sandwiched between the two substrates. The first substrate 1 includes a first base substrate 19, and a first polarizer 11 and a first alignment layer 13 that are disposed on the first base substrate 19, and the second substrate 2 includes a second base substrate 29, and a second polarizer 21, a second alignment layer 23 and a reflection layer 921 that are disposed on the second base substrate 29.

Figure 2:
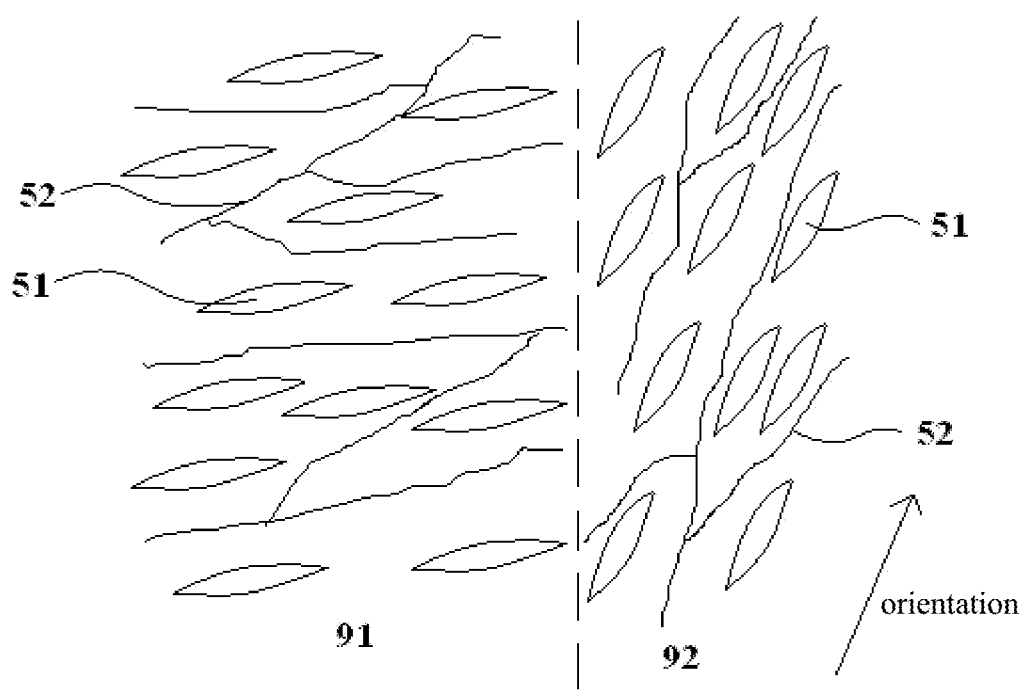
FIG. 2 is a schematic diagram showing a top view structure of a polymer network and nematic liquid crystal in a display panel according to an embodiment of the present disclosure.

Unlike a conventional display panel, as illustrated in FIGS. 1 and 2, a polymer network 52 is formed in the liquid crystal layer 5 of the reflection region 92. The polymer network 52 is formed as follows. After adding the liquid crystal mixture into the liquid crystal layer 5, the polymerizable monomers 521 in the liquid crystal mixture in the liquid crystal layer 5 corresponding to the reflection region 92 are polymerized. The polymer network 52 can function to assist alignment of the nematic liquid crystal 51 in the reflection region 92, such that the alignment direction of nematic liquid crystal 51 in the reflection region 92 is different from that of the first alignment layer (such as the direction of friction). At the same time, the alignment direction of nematic liquid crystal 51 in the transmission region 91 is the same as that of the first alignment layer. That is, in case that the alignment directions of the first alignment layers in both the reflection region 92 and the transmission region 91 are the same, the alignment directions of nematic liquid crystal 51 in these two regions are different from each other.

In the transmission region 91, the nematic liquid crystal 51 is aligned depending on the alignment layer (the first and second alignment layers will be collectively referred to as "alignment layer" hereinbelow because both of them influence the alignment direction of nematic liquid crystal), therefore the polymerizable monomers 521 in this region may not be polymerized but remain in the monomer state. That is, the liquid crystal layer 5 in the transmission region 91 may directly contain the liquid crystal mixture. However, as illustrated in FIGS. 1 and 2, in order to avoid unexpected reactions of the polymerizable monomers 521, it is also possible to allow polymerizable monomers 521 in the transmission region 91 to be polymerized into the polymer network 52 as well. That is, the liquid crystal layer 5 in the transmission region 91 may contain the polymer network 52 and the nematic liquid crystal 51. Here, the direction of the polymer network 52 in the transmission region 91 is the same as the alignment direction of the alignment layer, and therefore does not change the alignment direction of the nematic liquid crystal 51 in the transmission region 91.

The polymerizable monomer 521 may have the following structure: the polymerizable monomer 521 has a linear aliphatic chain having ester end group at its molecule end.

Alternatively, the polymerizable monomer 521 has a phenylene or a biphenylene at the middle of its molecule and at least one methylene, and the phenylene or the biphenylene may be replaced by one or more of alkyl or halogen groups.

Alternatively, the polymerizable monomer 521 includes at least one phenylene or biphenylene and a (methyl) acrylate end group connected with it via a bivalent alkylidene group, wherein the phenylene or biphenylene has one or more alkyl or halogen substituting groups.

Furthermore, in order to better form the polymer network 52, the degree of functionality of the polymerizable monomers 521 may be greater than 1 for example.

The exemplary structure of the polymerizable monomer 521 may be expressed in the following formula (I) for example:

crystal mixture may also contain photoinitiator with a weight percentage from 0.001 wt % to 2 wt % in the liquid crystal mixture.

That is, the photo polymerizable monomers that may be polymerized under photo illumination such as ultraviolet light irradiation may be used as the polymerizable monomers 521. Because light may be simply blocked, it is possible to easily polymerize polymerizable monomers 521 in various regions respectively. While photo polymerizable monomers are used, it is also possible to add photoinitiator into the liquid crystal mixture to initiate polymerization reaction.

Figure 3:
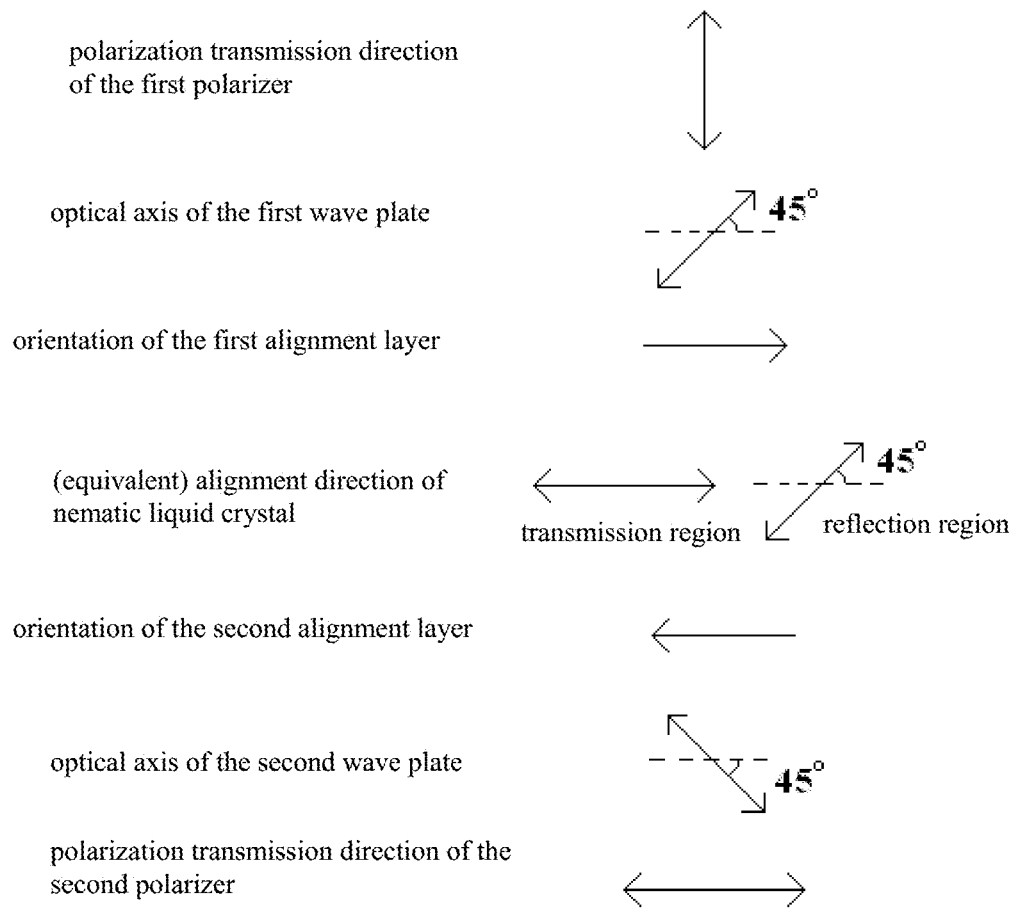
FIG. 3 is a schematic diagram showing orientations of structures in a display panel according to an embodiment of the present disclosure.

In addition, as illustrated in FIG. 3, in the display panel of the present embodiment, orientations of polarizer and alignment layers satisfy the following conditions. The polarization transmission directions of the first and second polarizers 11 and 21 are perpendicular to each other; orientations (such as rubbing directions) of the first and second alignment layers 13 and 23 are parallel or anti-parallel to each other; and the orientation of the first alignment layer 13 and the polarization direction of the first polarizer 11 are perpendicular to each other.

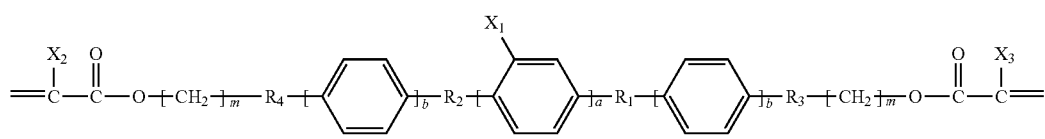

(I)

where "a" and "b" are integers from 0 to 5 independently, "m" are integers from 0 to 15 independently, $X_1$, $X_2$, and $X_3$ are hydrogen atom, halogen or methyl independently respectively, $R_1$, $R_2$, $R_3$ and $R_4$ are oxygen atom, ester group or methylene independently respectively, and in formula (I), "a" and "b" are not 0 at the same time; and when $R_3$ or $R_4$ is an oxygen atom or an ester group, the suffix "m" of the —$CH_2$— connected with it is not 0.

In the present embodiment, known products that can be used along with the nematic liquid crystal may be adopted as the polymerizable monomers 521. For example, commercially available RM257 monomer may be used which has rod-like structure similar to the nematic liquid crystal and therefore may be dissolved well in the nematic liquid crystal, and function to assist alignment of the nematic liquid crystal after polymerization. Because known substance can be used as the polymerizable monomers 521, their specific structures will not be described in detail herein.

Typically, in the present embodiment, commercially available CB5 is used as the nematic liquid crystal 51, and commercially available RM257 is used as the polymerizable monomer 521.

The weight percentage of the polymerizable monomers 521 in the liquid crystal mixture is from 0.01 wt % to 15 wt %. The above content of the polymerizable monomers 521 may form the polymer network 52 that can function to provide sufficient alignment effect, and will not impose obvious influence on the performance of the nematic liquid crystal 51.

In one example, the polymerizable monomers 521 may be photo polymerizable monomers, and the polymer network 52 is formed by light polymerization of the polymerizable monomers 521 in the liquid crystal mixture. Here, the liquid In the display panel of the present embodiment, in case of no electric field, the liquid crystal layer 5 in the reflection region 92 can deflect the polarization direction of the linearly polarized light incident in the direction of the first substrate 19 and reflected by the reflection layer 921 by 90 degree.

That is, in case of no electric field (dark state), the liquid crystal layer 5 in the reflection region 92 can rotate, by 90 degree, the polarization direction of the linearly polarized light that is incident and then reflected, thereby allowing the first polarizer 11 to completely block it to achieve a good dark state effect.

In the display panel of the present embodiment, the thickness d of the liquid crystal layer 5 satisfies the formula: $2nd=\lambda(2k+3/2)$; where n is the birefringence of the nematic liquid crystal 51, k is an integer greater than or equal to 0, and $\lambda$ is the wavelength of visible light.

That is, by setting the thickness of the liquid crystal layer 5 (namely the "cell gap"), the liquid crystal layer 5 can generate a phase difference of $(2k\pi+3\pi/2)$ for the transmitted visible light, or it may be that the liquid crystal layer 5 can function as a ¾ wave plate.

Typically, k is 0, and the thickness d of the liquid crystal layer 5 is from 1 μm to 10 μm.

According to the above formula, the liquid crystal layer 5 is exactly a ¾ wave plate only for light of the wavelength $\lambda$. For light of other wavelengths, the phase difference it generates is not $(2k\pi+3\pi/2)$; the larger the thickness of liquid crystal layer 5 is, the larger the difference between them is. Therefore, here, by setting k to 0, phase differences of light of other wavelengths are made minimal. Furthermore, visible wavelength is generally from 400 nm to 760 nm (for example, $\lambda$ may be from 530 nm to 580 nm), while the specific birefringence of conventional nematic liquid crystal is about 0.1. Therefore, it is possible to set the thickness d of the liquid crystal layer 5 to from 1 μm to 10 μm.

In the display panel of the present embodiment, as illustrated in FIG. 3, in case of no electric field, the equivalent optical axis of the liquid crystal layer 5 of the reflection region 92 forms a 45 degree angle with the polarization transmission direction of the first polarizer 11.

Because the alignment direction of the nematic liquid crystal 51 in the reflection region 92 is determined by the polymer network 52 and the alignment layers together, the alignment directions of the nematic liquid crystal 51 at different locations in the thickness direction in the reflection region 92 are different; the closer to the alignment layer the nematic liquid crystal 51 is, the more influence of the alignment layer it experiences, thereby the more approaching the orientation of the alignment layers. On the contrary, nematic liquid crystal 51 farther away from the alignment layer deviates from the orientation of the alignment layer more. Therefore, incapability of accurately pointing out what is the alignment direction of nematic liquid crystal 51 in the reflection region 92 means incapability of pointing out the direction of optical axis of the liquid crystal layer 5 in the reflection region 92. Here, the direction of optical axis of the liquid crystal layer 5, namely the direction of optical axis of the nematic liquid crystal 51, is the direction of long axis of the nematic liquid crystal, namely the alignment direction of the nematic liquid crystal. However, the overall function of the liquid crystal layer 5 in the reflection region 92 should be "equivalent to" a liquid crystal layer forming a 45 degree angle with the polarization transmission direction of the first polarizer 11. Therefore, it is that its "equivalent optical axis" forms a 45 degree angle with the polarization transmission direction of the first polarizer 11.

According to the above thickness of the liquid crystal layer 5 (equivalent to a ¾ wave plate), when the equivalent optical axis of the liquid crystal layer 5 in the reflection region 92 satisfies the above conditions, it is just possible to rotate the polarization direction of the incident and reflected linearly polarized light by 90 degrees, thereby achieving a good display effect in the dark state.

As illustrated in FIG. 3, according to the above structure, in case of no electric field (dark state), in the transmission region 91, the direction of optical axis of the liquid crystal layer 5 (namely the alignment direction of the nematic liquid crystal 51) is parallel to the orientation of the alignment layers, and light incident from the backlight becomes linearly polarized light with the polarization direction parallel to the optical axis of the liquid crystal layer 5 after passing the second polarizer 21. Therefore, the polarization direction of the light does not change after passing the liquid crystal layer 5, namely the ¾ wave plate, and it will be completely blocked by the first polarizer 11, thereby achieving a good dark state. In the reflection region 92, the reflected light becomes linearly polarized light with the polarization direction forming a 45 degree angle with the "equivalent optical axis" of the liquid crystal layer 5 after passing the first polarizer 11, and becomes circularly polarized light with a certain rotation direction after passing the liquid crystal layer 5 (namely the ¾ wave plate). While the rotation direction is reversed after the circularly polarized light is reflected by the reflection layer 921; then the light passes the liquid crystal layer 5 (¾ wave plate) again and becomes linearly polarized light with the polarization direction perpendicular to that of the incident light, and thereby is completely blocked by the first polarizer 11, which also achieves a good dark state.

When an electric field is applied, alignment directions of the nematic liquid crystal 51 in the liquid crystal layers 5 in both regions are deflected, and the deflecting actions of the liquid crystal on light change too, thereby allowing part of the light to pass to display desired luminance.

Figure 4:
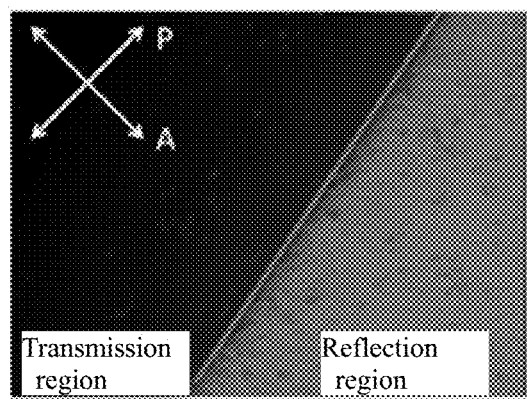
FIG. 4 is a picture of a boundary between a transmission region and a reflection region in a pixel in a display panel according to an embodiment of the present disclosure.
Figure 5:
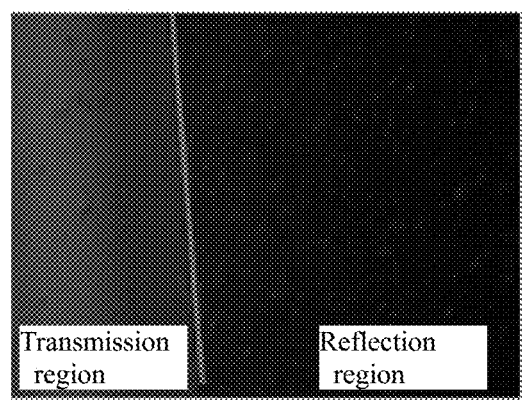
FIG. 5 is a picture of a boundary between a transmission region and a reflection region in another pixel in a display panel according to an embodiment of the present disclosure.
Figure 6:
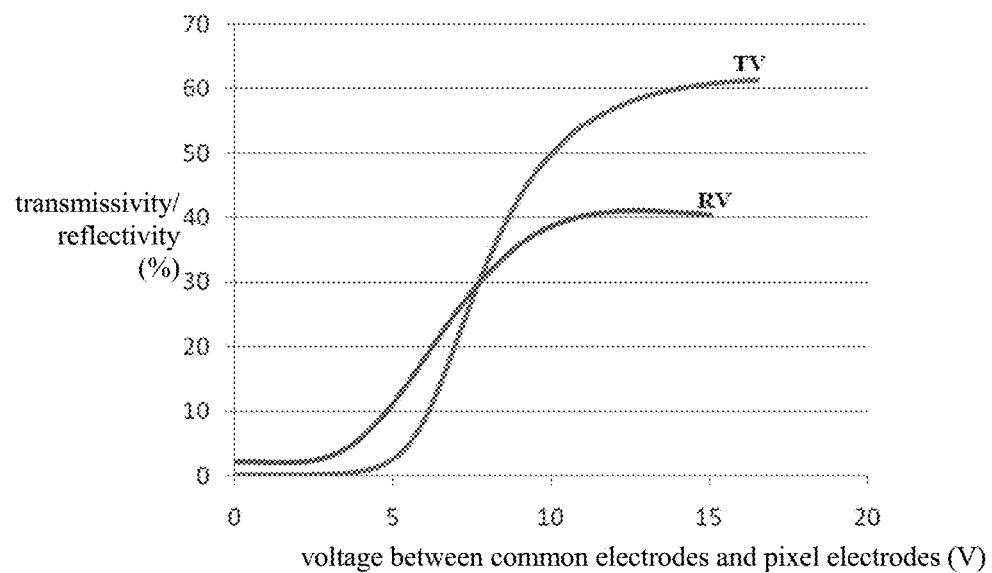
FIG. 6 is a test result diagram of a TV curve and a RV curve of a display panel according to an embodiment of the present disclosure.

Therefore, the display panel of the present embodiment can guarantee that both regions have good dark state display effects and improve the contrast without adding an in-cell retarder. Further, in the display panel of the present embodiment, the transmission region 91 and the reflection region 92 have sharp boundary therebetween and there is substantially no transition (as illustrated in FIGS. 4 and 5). At the same time, in the display panel of the present embodiment, both the transmission region 91 and the reflection region 92 have wide viewing angles (because they may be of the IPS or ADS mode). As illustrated in FIG. 6, the measured TV curve (the display curve of the transmission region 91) and the measured RV curve (the display curve of the reflection region 92) matches each other well.

Furthermore, the display panel of the present embodiment further includes: a first half-wave plate 12 and a second half-wave plate 22.

The first half-wave plate is disposed between the first alignment layer 13 and the first polarizer 11 in which the optical axis of the first half-wave plate 12 is parallel to the equivalent optical axis of the liquid crystal layer 5 in the reflection region 92 in case of no electric field.

The second half-wave plate is disposed between the second alignment layer 23 and the second polarizer 21 which is farther from the liquid crystal layer 5 than the reflection layer 912 and has an optical axis perpendicular to that of the first half-wave plate 12.

In the present embodiment, the first half-wave plate 12 is disposed between the first base substrate 19 and the first polarizer 11, and the second half-wave plate 22 is disposed between the second base substrate 29 and the second polarizer 21, to which the embodiment is however not limited.

Because the wavelength of visible light has a certain range, but the thickness of the liquid crystal layer 5 can only be set for a specific wavelength, light of other wavelengths in the dark state will experience leakage. Especially for a ¾ wave plate, it suffers from severer leakage at other wavelengths than a ¼ wave plate. Therefore, as illustrated in FIG. 1, it is possible to add a half-wave plate between either of the two substrates and the polarizer to reduce leakage of other wavelengths. Among them, the equivalent optical axis of the liquid crystal layer 5 in the reflection region 92 is parallel to that of the first half-wave plate 12, such that a maximum reflectance can be obtained. Theoretically, the two half-wave plates generate a total phase difference of $2k\pi$, which therefore can not influence the normal display. Because the approach of increasing the bandwidth of a ¾ wave plate (namely its adaptive wavelength range) by a half-wave plate is known, it will not be described in detail herein.

Further, the display panel of the present embodiment further includes a first electrode 81 and a second electrode 82 disposed on one base substrate, one of the first electrode 81 and the second electrode 82 is a pixel electrode and the other is a common electrode.

That is, in the display panel of the present embodiment, both the pixel electrode and the common electrode may be disposed in one substrate. Here, an example in which the electrodes are both disposed in the first substrate 1 (namely the first substrate 1 functioning as the array substrate) will be described. However, it is understood that it is also possible to dispose both the electrodes in the second substrate 2, which will not be described in detail here.

As one example of the present embodiment, as illustrated in FIG. 1, the first electrode 81 is a plate electrode, the second electrode 82 comprises a plurality of strip electrodes, an insulating layer 83 is disposed between the first electrode 81 and the second electrode 82, and the first electrode 81 is farther away from the liquid crystal layer 5 than the second electrode 82.

That is, the display panel of the present embodiment may be one of the advanced super dimension switch (ADS) mode, and therefore includes plate electrodes and strip electrodes. Specifically, it is possible that plate electrodes are common electrodes, strip electrodes are pixel electrodes; or alternatively, strip electrodes are common electrodes and plate electrodes are pixel electrodes.

As another example of the present embodiment, the first electrode 81 and the second electrode 82 both comprise a plurality of strip electrodes that are arranged alternatively.

That is, the display panel of the present embodiment may also be one of in plane switching (IPS) mode in which alternative strip electrodes are disposed.

The each of the above-mentioned strip electrodes (including strip electrodes in the above-mentioned two modes) has a width from 1 µm to 10 µm; and the distance between adjacent two of the plurality of strip electrodes is from 1 µm to 10 µm.

Both of the above two types of electrodes can generate electric fields mainly parallel to the substrate in the liquid crystal layer 5. In such a case, the nematic liquid crystal 51 may be liquid crystal of negative dielectric anisotropy. This is because such liquid crystal has a transverse axis perpendicular to the direction of the electric field, and therefore its rotation is mainly in the direction parallel to the substrate plane and more smooth. Of course, it is also feasible to adopt liquid crystal of positive dielectric anisotropy.

FIGS. 4 and 5 show a picture of the boundary between the reflection region 92 and the transmission region 91 of the display panel according to the present embodiment. As can be seen from FIGS. 4 and 5, directions of polymer networks 52 in the reflection region 92 and the transmission region 91 are obviously different and boundary between the two regions are remarkably clear. This indicates that the two regions of the display panel of the present embodiment have very obvious and sharp boundary therebetween.

Of course, the display panel of the present embodiment may further include other known structures. For example, the display panel of the present embodiment may further include a color filter film (not shown) for color display. The color filter film may be disposed on a substrate different from the electrodes (namely a separate color filter substrate), or on the same substrate as the electrodes (namely the COA mode). As another example, when pixel electrodes and common electrodes are disposed in the first substrate 1, in order to avoid influence on the electric field in the liquid crystal layer 5 by the reflection layer 921, a protection layer (not shown) may be covered on the reflection layer 921.

Embodiment II

As illustrated in FIGS. 7 to 10, the present embodiment provides a manufacturing method of the above-mentioned display panel, including: adding a liquid crystal mixture between the first alignment layer 13 and the second alignment layer 23 and applying an electric field to the liquid crystal mixture, and then allowing only the polymerizable monomers 521 in the liquid crystal mixture in the reflection region 92 to be polymerized into a polymer network 52.

That is, in manufacturing the above-mentioned display panel, the above-mentioned liquid crystal mixture is first provided between the two substrates. Then an electric field is applied to deflect the nematic liquid crystal 51 and separately allow polymerizable monomers 521 in the reflection region 92 to be polymerized into a polymer network 52. At the same time, polymerizable monomers 521 in the transmission region 91 do not react such that nematic liquid crystal 51 in the reflection region 92 is aligned into a direction different from the orientation of the alignment layers.

Specifically, the method of the present embodiment may include the following steps.

In S101, a liquid crystal mixture is provided between the first substrate 1 and the second substrate 2.

Figure 7:
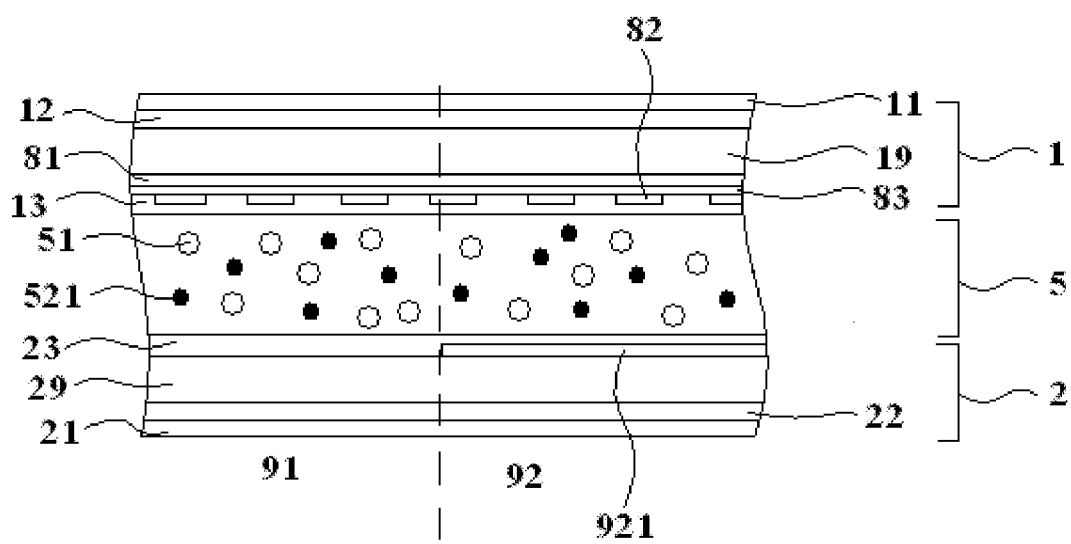
FIG. 7 is a schematic diagram showing a part cross section structure in a manufacturing method of a display panel before applying electric field according to an embodiment of the present disclosure.

That is, as illustrated in FIG. 7, a liquid crystal mixture is filled between the two substrates, the liquid crystal mixture includes nematic liquid crystal 51 and polymerizable monomers 521, and may further include photoinitiator as desired.

In S102, an electric field is applied to the liquid crystal mixture to deflect the nematic liquid crystal 51.

Figure 8:
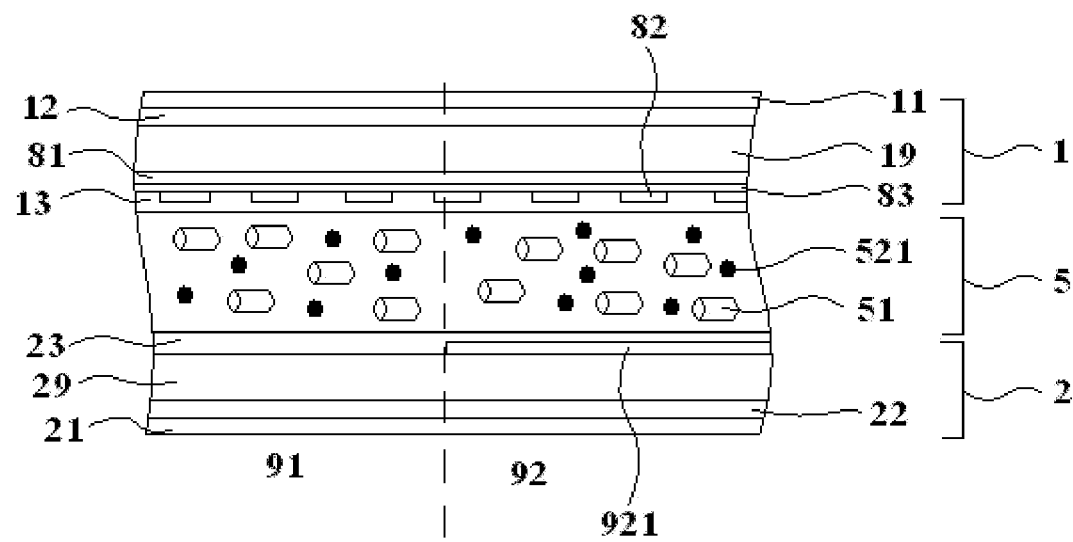
FIG. 8 is a schematic diagram showing a part cross section structure in a manufacturing method of a display panel before irradiation after applying electric field according to another embodiment of the present disclosure.

That is, as illustrated in FIG. 8, a voltage difference is applied between the common electrode and the pixel electrode of each pixel, thereby generating an electric field (such as an electric field parallel to the substrate) in the liquid crystal mixture to drive the nematic liquid crystal 51 in the liquid crystal mixture (including nematic liquid crystal 51 in the transmission region 91 and the reflection region 92) to rotate to a direction different from the orientation of the alignment layers.

Here, the specific strength of electric field is related to many factors such as the dielectric constant, viscosity of the nematic liquid crystal 51, and the anchoring capability of the alignment layers, etc. However, the strength of electric field is generally set to be from 0.5 V/µm to 5 V/µm.

In S103, when photo polymerizable monomers are used, a mask for masking transmission regions 91 is disposed on one side of the display panel and light is irradiated to the display panel from one side of the mask, which side is away from the display panel, such that polymerizable monomers 521 in the liquid crystal mixture in the reflection regions 92 are polymerized into the polymer network 52.

That is, as illustrated in FIG. 9, the mask is used to mask the transmission regions 91 while only reflection regions 92 are exposed. The display panel is illuminated with light via the mask such that only reflection regions 92 are illuminated and polymerizable monomers 521 in the reflection regions 92 are separated from the liquid crystal mixture and polymerized along intermolecular gaps in the nematic liquid crystal 51 to form the polymer network 52. Therefore, the polymer network 52 duplicates the morphology of liquid crystal at this time to align the nematic liquid crystal 51 in the reflection region 92 into a particular direction different from the orientation of the alignment layers, such that for example the equivalent optical axis of the liquid crystal layer 51 in the reflection region 92 forms a 45 degree angle with the polarization transmission direction of the first polarizer 11.

The light illumination conditions may be adjusted as desired. Generally, ultraviolet light with an intensity from 0.1 mw/cm$^2$ to 20 mw/cm$^2$ can be used to illuminate for 5-60 minutes.

Furthermore, it is also feasible to initiate the reaction of polymerizable monomers 521 by other means such as thermal polymerization. For example, it is possible to dispose a plurality of heating blocks that only contact reflection regions 92 for heating. However, although theoretically feasible, as compared with light illumination, it is difficult for thermal polymerization to guarantee that heat is only conducted to reflection regions 92 but not diffused to transmission regions 91. Therefore, the above-mentioned light polymerization is preferable.

In S103, the electric field and the mask are removed to allow polymerizable monomers 521 in the transmission region 91 to be polymerized into the polymer network 52.

Figure 10:
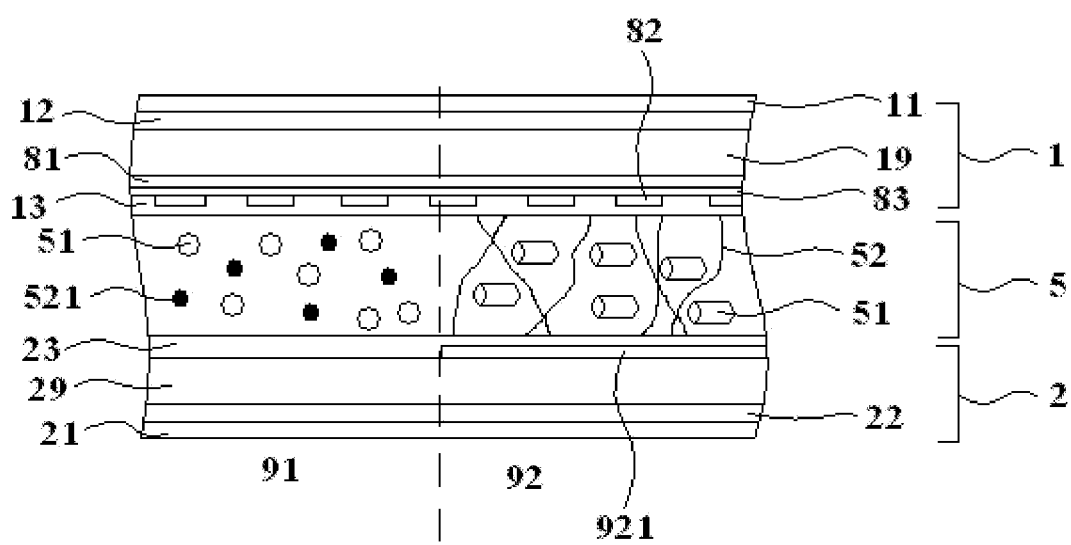
FIG. 10 is a schematic diagram showing a part cross section structure in a manufacturing method of a display panel before irradiation after removing the electric field according to another embodiment of the present disclosure.

That is, as illustrated in FIG. 10, after removing the electric field and the mask, the nematic liquid crystal 51 in the reflection region 92 is still oriented by the polymer network, while the nematic liquid crystal 51 in the transmission region 91 automatically restores to the state that is the same as the orientation of the alignment layers.

In S104, light is irradiated again to allow polymerizable monomers 521 in the transmission region 91 to be polymerized, thereby aligning the nematic liquid crystal 51 in this region into the direction same as the orientation of the alignment layers, resulting in a structure as illustrated in FIG. 1.

Because the polymerizable monomers 521 in the reflection region 92 have been polymerized, it does not matter even if the reflection region 92 are illuminated. Therefore, no mask is needed now, which makes the method simple.

Of course, because the polymer network 52 in the transmission region 91 does not practically effect alignment, this step is not necessary. However, in order to prevent remaining polymerizable monomers 521 therein from experiencing unwanted reaction, this step is preferably conducted.

The above manufacturing method is only a specific example of the present disclosure rather than a limitation to the present disclosure. Those skilled in the art may conduct many variations thereto. For example, it is also possible to mask the reflection region 92 with a mask in case of no electric field, polymerize polymerizable monomers 521 in the transmission region 91 first, then remove the mask and apply an electric field, and then polymerize the polymerizable monomers 521 in the reflection region 92 by light illumination. To sum up, as long as a manufacturing method includes the step of polymerizing polymerizable monomers 521 in the reflection region 92 separately in case of applying electric field, it falls within the scope of the present disclosure.

It is to be understood that the above implementations are only illustrative implementations for describing the principle of the present disclosure, and the present disclosure is not limited thereto. For those of ordinary skill in the art, various variations and improvements may be made without departing from the spirit and scope of the present disclosure, which are also considered to be in the scope of the present disclosure.

What is claimed is:

1. A display panel comprising a plurality of pixels, each of which comprises a transmission region and a reflection region, and a first polarizer, a first base substrate, a first alignment layer, a liquid crystal layer, a second alignment layer, a second base substrate, and a second polarizer that are disposed in turn;
   wherein a reflection layer is provided between the second alignment layer and the second polarizer in the reflection regions;
   the liquid crystal layer in the reflection region comprises nematic liquid crystal and a polymer network; the liquid crystal layer in the transmission region comprises a liquid crystal mixture comprising the nematic liquid crystal and polymerizable monomers;
   the polymer network in the reflection region is formed by polymerizing the polymerizable monomers in the liquid crystal mixture; and
   in case of no electric field, an alignment direction of the nematic liquid crystal in the reflection region is different from that of the first alignment layer, and an alignment direction of the nematic liquid crystal in the transmission region is same as that of the first alignment layer;
   wherein polarization transmission directions of the first polarizer and the second polarizer are perpendicular to each other;
   an orientation of the first alignment layer and an orientation of the second alignment layer are parallel or anti-parallel to each other;
   the orientation of the first alignment layer is perpendicular to the polarization transmission direction of the first polarizer; and
   in case of no electric field, the liquid crystal layer in the reflection region is capable of deflecting, by 90 degrees, a polarization direction of linearly polarized light incident in a direction from the first base substrate and reflected by the reflection layer;
   a thickness d of the liquid crystal layer satisfies a formula: $2nd=\lambda(2k+3/2)$, where n is a specific birefringence of the nematic liquid crystal, k is a unit-less integer greater than or equal to 0, and $\lambda$ is a wavelength, of visible light, a unit of $\lambda$ is nm, and a unit of d is μm.

2. The display panel of claim 1, wherein the polymerizable monomers in the liquid crystal mixture in the transmission region are polymerized into the polymer network.

3. The display panel of claim 1, wherein k is 0; and d is from 1 μm to 10 μm.

4. The display panel of claim 1, wherein in case of no electric field, an equivalent optical axis of the liquid crystal layer in the reflection region forms a 45 degree angle with the polarization transmission direction of the first polarizer.

5. The display panel of claim 1, further comprising:
   a first half-wave plate disposed between the first alignment layer and the first polarizer, wherein an optical axis of the first half-wave plate is parallel to an equivalent optical axis of the liquid crystal layer in the reflection region in case of no electric field; and
   a second half-wave plate disposed between the second alignment layer and the second polarizer, wherein the second half-wave plate is farther from the liquid crystal layer than the reflection layer and the second half-wave plate has an optical axis perpendicular to that of the first half-wave plate.

6. The display panel of claim 1, further comprising:
   a first electrode and a second electrode disposed on one of the base substrates, wherein one of the first electrode and the second electrode is a pixel electrode, and the other is a common electrode.

7. The display panel of claim 6, wherein the first electrode is a plate electrode, the second electrode comprises a plurality of strip electrodes, an insulating layer is disposed between the first electrode and the second electrode, and the first electrode is farther away from the liquid crystal layer than the second electrode.

8. The display panel of claim 6, wherein the first electrode and the second electrode comprise a plurality of strip electrodes arranged alternatively.

9. The display panel of claim 1, wherein the polymerizable monomers each have a linear aliphatic chain having ester end group at its molecule end; or the polymerizable monomers each have a phenylene or a biphenylene in a middle of its molecule and at least one methylene; or the polymerizable monomers each have at least one phenylene or biphenylene and a (methyl) acrylate end group connected therewith via a bivalent alkylidene group, wherein the phenylene or biphenylene is replaced or not replaced by one or more alkyls or halogens.

10. The display panel of claim 9, wherein the polymerizable monomers have a degree of functionality greater than 1.

11. The display panel of claim 1, wherein a weight percentage of the polymerizable monomers in the liquid crystal mixture is from 0.01 wt % to 15 wt %.

12. The display panel of claim 1, wherein the polymerizable monomers are photo polymerizable monomers, and the polymer network is formed by light polymerization of the polymerizable monomers in the liquid crystal mixture.

13. The display panel of claim 12, wherein the liquid crystal mixture further comprises photoinitiator with a weight percentage from 0.001 wt % to 2 wt % in the liquid crystal mixture.

14. The display panel of claim 1, wherein in case of an electric field being applied, alignment directions of the nematic liquid crystal in the liquid crystal layer in both of the transmission region and the reflection region are deflected, and deflecting actions of the liquid crystal on light change, so as to allow light to pass to display luminance.

15. The display panel of claim 14, wherein the case of no electric field and the case of an electric field being applied are performed in a display process of the display panel.

16. A display panel comprising a plurality of pixels, each of which comprises a transmission region and a reflection region, and a first polarizer, a first base substrate, a first alignment layer, a liquid crystal layer, a second alignment layer, a second base substrate, and a second polarizer that are disposed in turn;

wherein a reflection layer is provided between the second alignment layer and the second polarizer in the reflection regions;

the liquid crystal layer in the reflection region comprises nematic liquid crystal and a polymer network; the liquid crystal layer in the transmission region comprises a liquid crystal mixture comprising the nematic liquid crystal and polymerizable monomers;

the polymer network in the reflection region is formed by polymerizing the polymerizable monomers in the liquid crystal mixture; and in case of no electric field, an alignment direction of the nematic liquid crystal in the reflection region is different from that of the first alignment layer, and an alignment direction of the nematic liquid crystal in the transmission region is same as that of the first alignment layer, and in case of an electric field being applied, alignment directions of the nematic liquid crystal in the liquid crystal layer in both of the transmission region and the reflection region are deflected, and deflecting actions of the liquid crystal on light change, so as to allow light to pass to display luminance;

a thickness d of the liquid crystal layer satisfies a formula: $2nd=\lambda(2k+3/2)$, where n is a specific birefringence of the nematic liquid crystal, k is a unit-less integer greater than or equal to 0, and $\lambda$ is a wavelength of visible light, a unit of $\lambda$ is nm, and a unit of d is µm.

17. A manufacturing method of the display panel of claim 1, the manufacturing method comprising:

providing a liquid crystal mixture between a first alignment layer and a second alignment layer and applying an electric field to the liquid crystal mixture, and then allowing only polymerizable monomers in the liquid crystal mixture in the reflection region to be polymerized into a polymer network.

18. The manufacturing method of the display panel of claim 17, wherein the electric field has a strength from 0.5 V/µm to 5 V/µm.

19. The manufacturing method of the display panel of claim 17, wherein the manufacturing method further comprises:

in case of no electric field, allowing only the polymerizable monomers in the liquid crystal mixture in the transmission region to be polymerized into the polymer network.

* * * * *